(No Model.)
G. H. HUTTON.
SHIFTING SEAT.
No. 267,893. Patented Nov. 21, 1882.
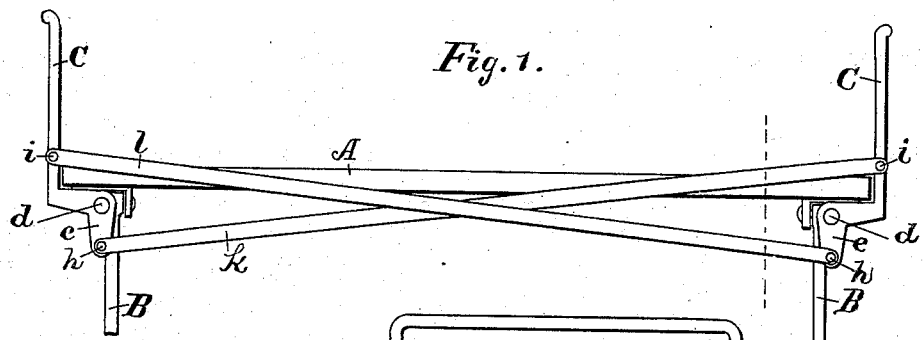
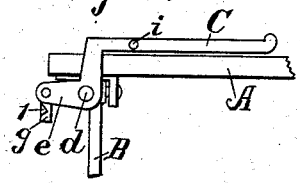
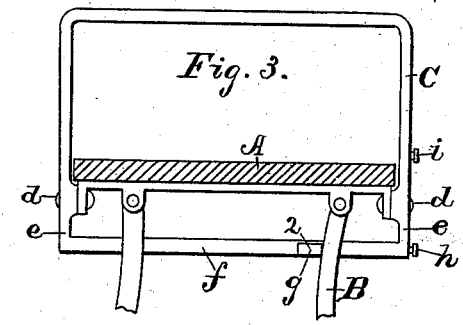
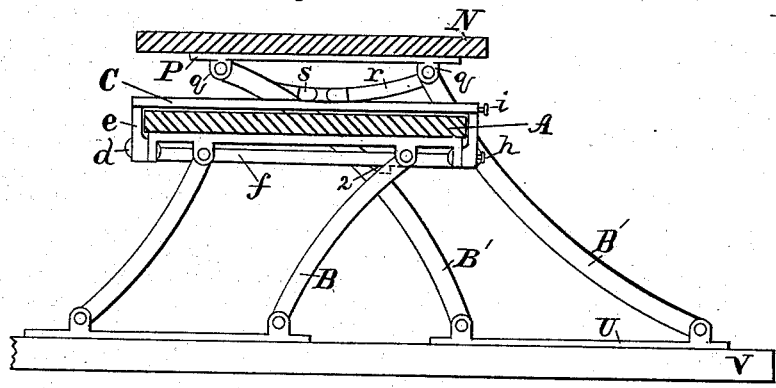
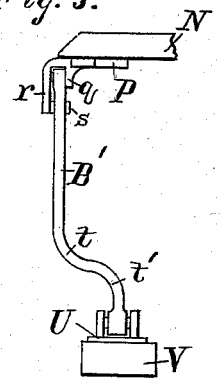
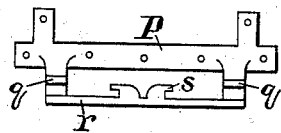
Witnesses:
A. C. Eader
John E. Morris
Inventor:
Geo. H. Hutton
By Chas. B. Mann
Attorney

UNITED STATES PATENT OFFICE.

GEORGE H. HUTTON, OF BALTIMORE, MARYLAND.

SHIFTING SEAT.

SPECIFICATION forming part of Letters Patent No. 267,893, dated November 21, 1882.

Application filed September 21, 1882. (No model.)

*To all whom it may concern:*

Be it known that I, GEORGE H. HUTTON, a citizen of the United States of America, residing at Baltimore, in the State of Maryland, have invented certain new and useful Improvements in Jump-Seats, of which the following is a specification, reference being had therein to the accompanying drawings.

My invention relates to improvements in jump-seats for vehicles, the construction and operation of which will first be described, and the invention will then be designated in the claims.

In the drawings, Figure 1 is a rear view of the front seat as seen when raised; Fig. 2, same view of one end, the arm being turned down against the top of the seat. Fig. 3 is a cross-section of the seat, showing the raised arm. Fig. 4 shows the position of the front seat when lowered to the rear and below the back seat. Fig. 5 is a rear view of one end of the back seat. Fig. 6 is an inverted plan view of one of the sill-plates on which the back seat is supported.

The letter A designates the front seat; B, the standards, which are pivoted in the usual way. Each end of this seat is provided with an arm or iron, C, which is pivoted at $d$ to the end of the same plate under the seat to which the standards are pivoted. Below the pivot each side of the iron extends, as at $e$, and the extremity of the said two extended parts are connected by a cross-bar, $f$, which, when the arm is upright, as in Figs. 1 and 3, occupies a horizontal position crosswise of and against the two standards. This cross-bar has a lug, $g$, which serves as the stop against which the rear standard B rests, causing it to maintain an upright position and support the front seat. The arm C, being pivoted at $d$, may be turned down against the top of the seat, as in Fig. 2, and thereby the cross-bar $f$, with its lug, is moved out, up, and away from the standards. (See Fig. 2.) The latter then, no longer having anything to maintain them upright, may be turned down, thus allowing the front seat to take a lower position to the rear, as shown in Fig. 4.

It will be seen that the arm C serves as a handle or as means by which the lug $g$ is disengaged from the standard. Thus the device is very simple, and convenient to operate. The front of the lug has a notch, 1, into which the edges of the standard fits. This prevents separate lateral motion of either part. The rear of the lug is beveled, as at 2. When the front seat is being raised from its low and rear position (and the arm C is raised) the bevel, when in contact with the standard, will readily pass over the standard without catching. The extremity of the extended part $e$ on the side at the back edge of the seat is provided with a button, $h$, and the arm is provided above the pivot with another button, $i$. The buttons $h$ and $i$ are equidistant from the pivot $d$, one below and the other above. The irons at each end of the seat are alike provided with these buttons, which serve the purpose of pivots. Two straps, $k$ and $l$, are employed to connect the irons at the opposite ends of the seat. In the present instance these straps are flexible, being made of leather; but they may be rigid and be made of wood or iron. The strap $k$ has one end attached to the lower button, $h$, of one iron and the other end to the upper button, $i$, of the other iron, and the strap $l$ is similarly placed on the other buttons, but crosses the strap $k$ at the center, as seen in Fig. 1. By this arrangement of buttons and straps both arms may be operated—that is, turned up or down alike—simply by grasping one of them.

The back seat, N, rests upon a sill-plate, P, which has two laterally-projecting ears, $q$, in each of which one of the standards B' are pivoted. The screws or bolts which secure the sill-plate to the seat enter the seat at a point back from the thin end edge, at which point the wood is thick, while the ears $q$ project out beyond the edge. This arrangement is to give the greatest possible space between the standards at the opposite ends of the seat, in order thereby to have room for the largest possible front seat to enter between them. To the outermost half of each ear $q$ one end of a cross-bar, $r$, is attached. This cross-bar curves downward or away from the plate P, and against its inner side the pivoted standards B' move. Two stop-lugs, $s$, are attached to the inner side of this curved cross-bar, and each of said lugs supports one of the standards B', and by causing it to maintain an upright position the seat is kept up. These lugs, like the one on the front-seat device, are notched, so as the better to grasp the standards, and thereby prevent separate lateral motion of either the seat or the standard. The lower ends of the standards B' are curved first inward and then downward, as at $t$ and $t'$, the extremity of the downward-curved part being pivoted to the plate U upon the frame V, or bottom of the carriage-body. This double curve of the lower end of the standard allows the main part of the standard to project outward, and is in correspondence with the laterally-projecting ears $q$, to which the upper end of the standard is pivoted, and, as before stated, affords greater space between the standards at the opposite end of the seat for a long front seat.

Having described my invention, I claim—

1. In a jump-seat, the combination, with the seat and the pivoted standards, of an arm, C, pivoted to the seat, and having at each side an extension, $e$, below the pivot, and a crossbar, $f$, connecting the two extended parts, and provided with a lug, $g$, as set forth.

2. In a jump-seat, the combination, with the seat and the pivoted standards, of an extension, $e$, below the pivot, a stop device attached to the extended parts, and two straps crossing each other at the center, each strap having one end pivoted to the arm above the arm-pivot $d$, and the other pivoted to the extended part below the said arm-pivot, as and for the purpose set forth.

In testimony whereof I affix my signature in presence of two witnesses.

GEO. H. HUTTON.

Witnesses:
JOHN E. MORRIS,
JNO. T. MADDOX.